(12) United States Patent
Jeng et al.

(10) Patent No.: US 6,383,443 B1
(45) Date of Patent: May 7, 2002

(54) SOL-GEL PROCESS FOR MAKING MONOLITHIC ALPHA-ALUMINA ARTICLES HAVING CONTROLLED POROSITY

(75) Inventors: De-Yin Jeng, Oak Park; Chorng-Jeou Chen, Westlake Village; Takayuki Suzuki, Camarillo, all of CA (US)

(73) Assignee: Yazaki Corporation (JP)

( * ) Notice: Subject to any disclaimer, the term of this patent is extended or adjusted under 35 U.S.C. 154(b) by 0 days.

(21) Appl. No.: 09/448,712

(22) Filed: Nov. 24, 1999

(51) Int. Cl.$^7$ .................... C04B 35/624; C04B 35/10
(52) U.S. Cl. .................... 264/621; 264/650; 264/658; 264/660; 501/12
(58) Field of Search .................... 264/621, 650, 264/658, 660; 501/12

(56) References Cited

U.S. PATENT DOCUMENTS

| | | | |
|---|---|---|---|
| 3,941,719 A | | 3/1976 | Yoldas .................... 252/463 |
| 4,045,412 A | * | 8/1977 | Yamada et al. ............. 264/670 |
| 4,472,510 A | * | 9/1984 | January .................... 501/12 |
| 4,681,615 A | * | 7/1987 | Toki et al. .................... 501/12 |
| 5,076,980 A | * | 12/1991 | Nogues et al. .............. 264/621 |
| 5,204,300 A | * | 4/1993 | Kumagai et al. ............. 501/12 |

OTHER PUBLICATIONS

The Condensed Chemical Dictionary, 1961, Reinhold Pub. Corp., New York, p. 1019, 1961.*
Zelinski, B. J. and Uhlmann, D. R., "Gel Technology In Ceramics," J. Phys. Chem. Solids, (1984), vol. 45, No. 10, pp. 1069–1090.
Ramanathan, S., Bhat, R., Upadhyaya, D. D. and Roy, S. K., "Alumina ceramics by sol–gel technique," Bull Mater. Sci, Apr. 1994, vol. 17, No. 2, pp. 95–103.
Yoldas, B. E., "Alumina gels that form porous transparent $Al_2O_3$," Journal of Materials Science, (1975), vol. 10, pp.1856–1860.
Yoldas, B. E., "A Transparent Porous Alumina," Ceramic Bulletin, (1973), vol. 54, No. 3, pp. 286–288.
Kumagai, M. and Messing, G. L., "Enhanced Densification of Boehmite Sol–Gels by a–Alumina Seeding," Communications of the American Ceramic Society, Nov., 1984, pp. 230–231.
Kumagi, M. and Messing, G. L., "Controlled Transformation and Sintering of a Boehmite Sol–Gel by a–Alumina Seeding," J. Am. Ceram. Soc., (1985), vol. 68[9], pp. 500–505.
Shelleman, R. A. Messing, G. L. and Kumagai, M., "Alpha Alumina Transformation in Seeded Boehmite Gels," Journal of Non–Crystalline Solids, (1986), vol. 82, pp. 277–285.
Messing, G. L., and Kumagai, M., "Low–Temperature Sintering of a–Alumina–Seeded Boehmite Gels," American Ceramic Society Bulletin, Oct., 1994, vol. 73, No. 10, pp. 88–91.
Bagwell, R. B. and Messing, G. L., "Critical Factors in the Production of Sol–Gel Derived Porous Alumina," Key Engineering Materials, (1996), vol. 115, pp. 45–64.
Kwon, S. and Messing, G. L., "Dry Pressing Boehmite Gels for the Fabrication of Monolithic a–$Al_2 O_3$," Journal of Sol Gel Science and Technology, (1997), vol. 9, pp. 53–64.
Olszyna, A. R., Marchlewski, P. and Kurzydlowski, K. J., "Sintering of High–Density, High–Purity Alumina Ceramics," Ceramics International, 1997, pp. 323–328.

* cited by examiner

Primary Examiner—James Derrington
(74) Attorney, Agent, or Firm—Sheppard, Mullin, Richter & Hampton LLP; James R. Brueggemann

(57) ABSTRACT

Disclosed is a sol-gel process for making high-density monolithic alpha-alumina articles. Cracking problems caused by shrinkage of the gel during the drying and firing stages are minimized by controlling the temperature and humidity during the drying process and by using molds formed of prescribed polymeric materials, preliminarily coated with a silicone release agent. The process of the invention provides porous alpha-alumina articles having a controlled microstructure and a controlled pore size distribution, which are beneficial features when the material is used in practical applications, e.g., as substrates for gas sensors.

16 Claims, No Drawings

SOL-GEL PROCESS FOR MAKING MONOLITHIC ALPHA-ALUMINA ARTICLES HAVING CONTROLLED POROSITY

BACKGROUND OF THE INVENTION

This invention relates generally to alpha-alumina articles and, more particularly, to alpha-alumina articles made using a sol-gel process.

Porous ceramics having interconnected pores ranging in size from nanometers to millimeters have been used as filters, catalyst carriers, acoustic absorbers, membranes, and heat exchangers in various industrial applications. Alumina, silica, mullite, corderite, aluminosilicate, and zeolites are among the commonly used ceramic materials.

Porous alumina is an excellent candidate for many applications, because of its good mechanical strength, thermal stability, and chemical durability. Hollow alumina honeycombs are used in food and beverage processing and in biotechnology for purposes such as removing bacteria in breweries and filtering gases and fluids. The same material also can be used to remove sulfur and nitrogen from coal gasifiers. Alumina materials having small pore sizes also are used as molecular sieves to separate hydrogen from coal gasification gases. Other applications of porous alumina include filters for high temperature gas clean-up and catalyst support for removing $NO_x$ and $SO_x$ from flue gases. Recently, porous alumina has been used as a casting mold for slip casting processes.

In a particularly important application, porous alumina substrates are used as the diffusion rate-determining member in thin-film, limiting-current type oxygen sensors for both low and high oxygen concentrations. In such applications, the alumina substrate serves as a diffusion barrier for oxygen transport. When the admission of oxygen is restricted, such as by the porosity and pore size of the substrate, a saturated region is reached in which the sensor output current remains constant despite a voltage increase. This phenomenon occurs because of the rate-determining oxygen transport process from the outside environment, through the porous substrate, and onto the sensor electrode. Consequently, a porous (sintered) alumina substrate can be used effectively as the rate-determining member for the oxygen diffusion process.

Currently, such porous alumina substrates typically are made by tape casting of alumina slurries that incorporate alumina powders of several different particle sizes. This casting process generally leads to an inhomogeneous microstructure in the substrate, with low manufacturing yields, especially for sensor applications. Other disadvantages of the tape casting process include large pore sizes in the substrates and uneven pore size distribution. For the oxygen sensor applications described above, large pore sizes are detrimental because they are outside the Knudsen diffusion regime, causing: (1) loss of linearity between current and concentration at high oxygen concentrations, (2) limited low oxygen concentration detection capabilities (detection lower limit ~100 ppm at ~50 nm pore size, 50 ppm at 30 nm pore size), and (3) slow response time.

The sol-gel process is a well-known technique for making ceramic materials in varying forms such as thin film, bulk, fiber and powder. Boehmite (Al—O—O—H) and pseudo-boehmite are good precursors for the fabrication of alpha-alumina-based ceramics. Sol-gel processing with boehmite provides better chemical homogeneity and improved microstructure control. When heated to high temperatures, boehmite transforms to several transition aluminas before the formation of the thermodynamically stable alpha phase, at about 1200° C.

Monolithic alumina also has been made by hydrolyzing aluminum alkoxides, such as aluminum sec-butoxide, at 90° C. Although this process has produced transparent monolithic boehmite gels having small pore sizes and a narrow pore size distribution, the densities of these gels have been unduly low after sintering, i.e., less than a 45% theoretical density, or greater than a 55% porosity.

Boehmite gels of high density originally were considered impossible to obtain at sintering temperatures below 1600° C. However, by seeding the boehmite with alpha-alumina powders, the seed particles can function as nucleation sites that increase the transformation kinetics and decrease the required transformation temperature. Seeded boehmite gel-derived alpha alumina substrates can be sintered to a density of about 99% at temperatures as low as 1150° C. However, monolithic alpha-alumina gels generally have not been obtained directly from gels in this manner, because the gels generally crack during drying. This cracking problem has restricted the development of alumina gels to small dimensions, such as thin-film coatings and abrasive grains.

Thus, although seeding has allowed boehmite gels to be sintered to a high density, the fabrication of alumina monoliths generally has required the cracked gel fragments first to be ground into powder and then pressed into pellets, for subsequent consolidation into dense compact forms before sintering. Therefore, a powder-dispersion-consolidation process still has been required to fabricate dense alumina monoliths.

It should therefore be appreciated that there is a need for a practical method for producing monolithic porous alumina articles having small, well-defined pore radii. The present invention fulfills this need.

SUMMARY OF THE INVENTION

The present invention resides in a high-density, crack-free monolithic alpha-alumina article, and a sol-gel process for making it, having small, well-defined pore diameters. The process includes: (1) casting in a mold a solution of an aluminum alkoxide (e.g., aluminum sec-butoxide), alpha-alumina powder, water, and a peptizing agent, (2) drying the cast solution in a controlled environment having a temperature in the range of about 25 to 40° C. and a humidity in the range of about 75 to 95%, to produce a dried gel, and (3) sintering the dried gel, to produce the high-density, crack-free monolithic alpha-alumina article.

In a separate feature of the invention, the process uses a mold formed of a material selected from the group consisting of PMP (polymethylpentene), Teflon PFA (perfluoroalkoxy resin), Teflon FEP (fluorinated ethylenepropylene copolymer), and Teflon PTFE (poly tetrafluoroethylene polymer). The entire mold, or alternatively merely an inner liner of the mold, can be formed of such material. Further, sintering occurs at a temperature in the range of about 1000° C. to about 1400° C., and preferably in the range of about 1000° C. to about 1100° C., for a time period in the range of about 3 to about 12 hours. In addition, casting can include preliminarily applying a mold release agent, preferably a silicone agent, to the mold. Casting and drying can occur using the same mold.

The resulting high-density, crack-free monolithic alpha-alumina article has a density in the range of about 83 to 98%, with pores having diameters in the range of about 8 to 120 nanometers. The article, thereby, is suitable for use as a substrate for such devices as a gas sensor device, e.g., an oxygen sensor device. The preferred article has a density greater than about 95%, with pores having an average radius of less than about 30 nanometers. In addition, the article preferably has the shape of a disk, with a diameter greater than about 25 millimeters.

Other features and advantages of the present invention should become apparent from the following detailed description of the invention, which discloses, by way of example, the principles of the invention.

DETAILED DESCRIPTION OF THE INVENTION

The present invention resides in a sol-gel process for making high-density porous alpha-alumina articles, of theoretical density in the range of about 83 to 98%. The gels are produced by casting a suitable aluminum alkoxide (e.g., aluminum sec-butoxide or aluminum iso-propoxide), alpha-alumina, water, and a suitable peptizing agent (e.g., nitric acid, hydrochloride acid, or ammonium hydroxide). Cracking of the gels during drying is prevented by controlling the temperature and humidity of the drying condition and by using a mold formed of PMP (polymethylpentene), Teflon PFA (perfluoroalkoxy resin), Teflon FEP (fluorinated ethylene propylene copolymer), and Teflon PTFE (poly tetrafluoroethylene polymer), with a silicone release agent (e.g., Leco, Part No.811-271).

Optimization of the drying humidity and temperature reduces the internal stress of the gel during drying and assists in the formation of a crack-free monolithic gel. In addition, the dried gels can be fired to high temperatures for the formation of stable aluminum oxides without cracking. The drying conditions include a controlled temperature of about 25 to 40° C. and a controlled humidity of about 75 to 95% relative humidity (RH), for about 70 to 100 hours. The gels are then further dried at room temperature conditions, i.e., about 25° C. and about 55% RH, for another 24 to 72 hours. Suitable drying conditions for preventing cracking during gelation are disclosed in the following Table 1.

As can be seen in Table 1, it is desirable to maintain the temperature in the range of about 25 to 40° C., while at the same time maintaining the relative humidity in the range of about 75 to 95%. If the initial drying conditions are outside of these limits, the monolithic gels can crack.

TABLE 1

| Sample # | Temperature (° C.) | Humidity (% RH) | Results |
| --- | --- | --- | --- |
| 1 | 25 | 55 | cracked |
| 2 | 30 | 55 | cracked |
| 3 | 25 | 95 | OK |
| 4 | 30 | 95 | OK |
| 5 | 35 | 95 | OK |
| 6 | 40 | 95 | OK |
| 7 | 30 | 80 | OK |
| 8 | 35 | 75 | OK |

Another feature of the process of the invention is the use of special materials for the molds. The use of a PMP or Teflon mold, and the use of a silicone release agent, allows the gel to be readily separated from the mold after gelation without cracking. PMP molds having an opening diameter of 63.5 mm and a volume of 125 ml can be obtained from commercial sources, e.g., Fischer Scientific, Part No. 118.2330. Teflon molds of various types (PTFE, FEP, PFA) can be obtained from numerous commercial sources or produced to custom requirements.

The silicone release agent preferably is sprayed onto the interior wall of the mold about 10 to 60 minutes before sol casting. The sprayed agent should coat a uniform layer on the mold wall without the formation of liquid droplets. Excess liquid remaining on the mold can be removed by using a lint-free laboratory tissue. A non-uniform coating of the wall with the release agent can result in an uneven release of the gel from the wall, whereas excess droplets of release agent can cause dimples to be formed in the dried gels.

The benefits of using the specified mold material along with a silicone release agent are demonstrated in Table 2. It is seen that the dried monolithic gel would crack unless the mold or its inner liner is formed of some type of PMP or Teflon and a silicone release agent is used. Molds formed of certain materials such as glass or polystyrene produced cracked gels even if a silicone release agent was used. PMP and Teflon molds produced cracked gels if used without a silicone release agent, but they provided good gels when used in combination with such a release agent. A Teflon liner coated onto a metal mold also produced good articles when used with a silicone release agent.

TABLE 2

| Mold # | Mold Type | No SRA | With SRA* |
| --- | --- | --- | --- |
| 1 | Polystyrene petri dish | cracked | cracked |
| 2 | Pyrex glass petri dish | cracked | cracked |
| 3 | PMP 250 ml container | cracked | good |
| 4 | Teflon PFA beaker | cracked | good |
| 5 | Teflon PTFE beaker | cracked | good |
| 6 | DuPont Teflon coating (FEP copolymer) | cracks after several uses of the mold | good |

SRA*= Silicone release agent (mold release), LECO part# 811-271.
Mold #6 was DuPont Teflon coating on an aluminum body.

EXAMPLE

The following example is given as a particular implementation of the process of the invention. It sets forth some of the properties of the alpha-alumina article that is produced, and it demonstrates the process' practical advantages. This example should be construed only as illustrative, and it does not limit the remainder of the disclosure or the claims.

The following steps were used to prepare the preferred monolithic alpha-alumina gels of the invention:

1. Solution A was formed in a first beaker, by combining 100 grams of aluminum sec-butoxide with 278 ml of water and refluxing at 90° C., under vigorous stirring. The molar ratio was $H_2O: Al(OC_4H_9)_3 = 40:1$.
2. 2.43 grains of a nitric acid peptizing agent, $HNO_3$ (70 wt %), then were added to solution A, while stirring. The molar ratio was $HNO_3:Al=0.07:1$.
3. Solution B was formed in a second beaker, by mixing Sumitomo AKP-50 alpha-alumina powders, average particle size about 0.4 microns, with deionized water. The pH value of solution B was adjusted to 3.0 by adding $HNO_3$. Solution B then was stirred for 24 hours, at room temperature.
4. Solution B was then centrifuged at 2000 rpm, for 40 minutes.
5. The supernatant portion of the centrifuged solution B then was added to the solution A.
6. The mixture of solution A was refluxed at 90° C. for 24 hrs, under vigorous stirring.
7. The solvent of solution A was boiled off by heating at 110° C. for 3 hrs.

8. Solution A then was cast into several 125-ml PMP molds, using 15–25 ml per mold. The mold dimensions were approximately 63.5 mm in diameter by 63.5 mm in height.
9. Prior to casting the sol (above) the inside of the mold is uniformly coated with silicone release agent, as previously described.
10. The cast solution was allowed to gel and dry in a controlled environment, at 25 to 40° C., and 75 to 95% RH.
11. The semi-dried gels were inverted after about 50 hours of drying.
12. The gels continued to dry under the same controlled conditions for another 24–48 hours, until the gel diameter was about 67% of the original mold diameter.
13. As a final drying step, the gels were dried at room temperature and humidity (about 25° C. and 55% RH), until the gel diameter was about 60% of the original mold diameter.
14. The dried gel was placed into a sintering furnace, and the temperature was raised to about 1050° C., over approximately 24 hours.
15. The gels were sintered between 1000 and 1400° C., typically at 1050° C., for 3 to 12 hrs.
16. The density was measured to determine the gels' porosity.

The gel's dimensions before sintering were about 34 mm in diameter and 2–4 mm in thickness. After sintering at 1050° C. for 9 hrs, the gel showed a radial shrinkage of about 18% and a thickness shrinkage of about 20 to 25%, with a theoretical density of greater than about 95%. The article had an open porosity with an average pore radius of less than about 30 nm.

It should be appreciated from the foregoing description that the present invention provides an improved sol-gel process for making high-density monolithic alpha-alumina articles. Cracking problems caused by shrinkage of the gel during the drying and sintering stages are minimized by controlling the temperature and humidity during the drying process and by using molds formed of prescribed polymeric materials, preliminarily coated with a silicone release agent. The process of the invention provides porous alpha-alumina articles having a controlled microstructure and a controlled pore size distribution, which are beneficial features when the material is used in practical applications, e.g., as substrates for gas sensors.

Although the invention has been described in detail with reference only to the presently preferred process, those of ordinary skill in the art will appreciate that various modifications can be made without departing from the invention. Accordingly, the invention is defined only by the following claims.

We claim:
1. A process for making a high-density, crack-free monolithic alpha-alumina article, comprising;
   casting in a mold a solution consisting essentially of an aluminum alkoxide, alpha-alumina powder, water and a peptizing agent;
   drying the cast solution in a controlled environment having a temperature in the range of about 25 to 40° C. and a humidity in the range of about 75 to 95%, to produce a dried gel; and
   sintering the dried gel, to produce a high-density, crack-free monolithic alpha-alumina article.
2. A process as defined in claim 1, wherein the mold used in drying comprises a material selected from the group consisting of a polymethylpentene (PMP), perfluoroalkoxy resin (PFA), fluorinated ethylene propylene copolymer (FEP), and polytetrafluoroethylene polymer (PTFE).
3. A process as defined in claim 1, wherein the mold used in drying has an inner liner formed of a material selected from the group consisting of a polymethylpentene (PMP), perfluoroalkoxy resin (PFA), fluorinated ethylene propylene copolymer (FEP), and polytetrafluoroethylene polymer (PTFE).
4. A process as defined in claim 1, wherein sintering occurs at a temperature in the range of about 1000° C. to about 1400° C.
5. A process as defined in claim 4, wherein sintering occurs for a time period in the range of about 3 to about 12 hours.
6. A process as defined in claim 1, wherein casting includes preliminarily applying a mold release agent to the mold.
7. A process as defined in claim 6, wherein the mold release agent preliminarily applied to the mold during casting is a silicone mold release agent.
8. A process as defined in claim 1, wherein casting and drying occur using the same mold.
9. A process as defined in claim 1, wherein the process is free of an intermediate process step of consolidating particles of alumina.
10. A process as defined in claim 1, wherein:
    the aluminum alkoxide used in casting is aluminum sec-butoxide; and
    the peptizing agent used in casting is nitric acid.
11. A process for making a high-density, crack-free monolithic alpha-alumina article, comprising:
    casting a solution consisting essentially of an aluminum alkoxide, alpha-alumina powder, water and a peptizing agent;
    drying the cast solution in a controlled environment, to produce a dried gel;
    wherein casting and drying both occur using a mold that comprises a material selected from the group consisting of a polymethylpentene (PMP), perfluoroalkoxy resin (FA), fluorinated ethylene propylene copolymer (FEP), and polytetrafluoroethylene polymer (PTFE); and
    sintering the dried gel, to produce a high-density, crack-free monolithic alpha-alumina article.
12. A process as defined in claim 11, wherein the mold used in casting and drying has an inner liner formed of a material selected from the group consisting of a polymethylpentene (PMP), perfluoroalkoxy resin (PFA), fluorinated ethylene propylene copolymer (FEP), and polytetrafluoroethylene polymer (PTFE).
13. A process as defined in claim 11, wherein:
    the controlled environment present during drying has a temperature in the range of about 25 to 40° C. and a humidity in the range of about 75 to 95%; and
    sintering occurs at a temperature in the range of about 1000° C. to 1400° C., for a period of about 3 to 12 hours.
14. A process as defined in claim 11, wherein casting includes preliminarily applying a silicone mold release agent to the mold.
15. A process as defined in claim 11, wherein the process is free of an intermediate process step of consolidating particles of alumina.
16. A process as defined in claim 11, wherein:
    the aluminum alkoxide used in casting is aluminum sec-butoxide; and
    the peptizing agent used in casting is nitric acid.

* * * * *